United States Patent
Suzuki et al.

(10) Patent No.: US 7,335,310 B2
(45) Date of Patent: Feb. 26, 2008

(54) METHOD OF TREATING WASTEWATER CONTAINING HARDLY DECOMPOSABLE HARMFUL SUBSTANCES

(75) Inventors: Motoshi Suzuki, Chiba (JP); Takahiro Kawabata, Chiba (JP); Hideo Miyamoto, Chiba (JP); Takahisa Muramoto, Chiba (JP); Masashi Machida, Chiba (JP); Shingo Ogoshi, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 10/544,074

(22) PCT Filed: Aug. 4, 2003

(86) PCT No.: PCT/JP03/09881

§ 371 (c)(1),
(2), (4) Date: Apr. 13, 2006

(87) PCT Pub. No.: WO2004/067453

PCT Pub. Date: Aug. 12, 2004

(65) Prior Publication Data

US 2006/0226083 A1    Oct. 12, 2006

(30) Foreign Application Priority Data

Jan. 31, 2003  (JP) .......................... 2003-023626
Feb. 6, 2003  (JP) .......................... 2003-029747

(51) Int. Cl.
  *C02F 3/00*  (2006.01)
(52) U.S. Cl. .................... 210/729; 210/732; 210/759
(58) Field of Classification Search ............... 210/729, 210/732–736, 759
See application file for complete search history.

(56) References Cited

FOREIGN PATENT DOCUMENTS

| CN | 1227192 | 9/1999 |
|---|---|---|
| GB | 2 056 962 A | 3/1981 |
| JP | 2000-218278 | 8/2000 |
| JP | 2001-149949 | 6/2001 |
| JP | 2001-179211 | 7/2001 |
| JP | 2001-179269 | 7/2001 |
| JP | 2001-232356 | 8/2001 |
| JP | 2002-035772 | 2/2002 |
| JP | 2002-153703 | 5/2002 |
| JP | 2002-153866 | 5/2002 |

(Continued)

OTHER PUBLICATIONS

E. D. Babenkov, "Water Treatment by Coagulants", Izdatelstvo Nauka, Moscow, 1977, pp. 260-261 (with English translation).
A. Ashirov, "Ion-Exchange Treatment of Waste Water, Solutions and Gases", Leningrad, "Khimia", 1983, pp. 18-19 (with English translation).

*Primary Examiner*—Chester T. Barry
(74) *Attorney, Agent, or Firm*—Oblon, Spivak, McClelland, Maier & Neustadt, P.C.

(57) ABSTRACT

A method of treating hardly decomposable harmful substance comprising (A) a step for adding coagulant into wastewater containing a hardly decomposable harmful substance, (B) a step for performing solid-liquid separation which separates a solid containing the hardly decomposable harmful substance from a liquid, and (C) a step for decomposing the hardly decomposable harmful substance by bringing peroxide into contact with the separated solid. Efficiently and safely treating the hardly decomposable harmful substances by means of low-cost facilities realizes.

27 Claims, 1 Drawing Sheet

FOREIGN PATENT DOCUMENTS

| | | |
|---|---|---|
| JP | 2002-153891 | 5/2002 |
| JP | 2002-159975 | 6/2002 |
| JP | 2002-186963 | 7/2002 |
| JP | 2002-239597 | 8/2002 |
| JP | 2002-320974 | 11/2002 |
| JP | 2002-355638 | 12/2002 |
| JP | 2003-001277 | 1/2003 |
| JP | 2003-033605 | 2/2003 |
| JP | 2003-033772 | 2/2003 |
| JP | 2003-200134 | 7/2003 |
| WO | WO 95/21794 | 8/1995 |

METHOD OF TREATING WASTEWATER CONTAINING HARDLY DECOMPOSABLE HARMFUL SUBSTANCES

TECHNICAL FIELD

The present invention relates to a method of treating wastewater containing hardly decomposable harmful substances. More particularly, the present invention relates to a method for treating wastewater which coagulates and separates hardly decomposable harmful substances from wastewater containing the hardly decomposable harmful substances, and efficiently decomposes the separated hardly decomposable harmful substances.

BACKGROUND ART

Hardly decomposable substances such as dioxins known as the substance harmful to human body, i.e., hardly decomposable harmful substances are discharged into natural environment from incinerator for urban waste or industrial waste and various combustion facilities or machineries.

Moreover, various kinds of organic compounds in manufacturing process of chemical substance which will unintentionally give bad influence upon environment are discharged causing big social problems. Although the generation mechanism of chloridized aromatic compound such as dioxins, chlorophenol, chlorobenzene is not apparent, it is said that they generate in a treating process for wasting gas of low temperature in the presence of nonflammable carbon, air, moisture, inorganic chlorine, etc.

As sources of releasing wastewater containing these compounds, chloride base bleach facilities in Kraft pulp production plant, decomposition facilities of wasted PCB or processed PCB, cleaning equipment for PCB contaminant or PCB processed product, cleaning equipment modifying fusion furnace to provide for manufacture of aluminum and aluminum alloy, wet type dust collection facilities, waste pit discharging sewage, etc., are known. Namely, a process using compounds containing chlorides has probability of generating the foregoing wastewater.

Further, standard of aqueous environment pollutant was revised by Ministry of Environment and as a result, organic compounds such as trichloroethylene, tetrachloroethylene, PCB were newly added to object substance of the environmental quality standard in which heavy metals were main entity until then. It is probable that a slight amount of harmful substance such as organophosphorus compound, PCB, trichloroethylene, dioxines, bisphenols and so on is contained in industrial wastewater, in addition to oils, chemical oxygen demand (COD), biochemical oxygen demand (BOD) and suspended substance (SS).

Conventionally, technologies for decomposing hardly decomposable harmful substances in wastewater which removes the hardly decomposable harmful substances as much as possible from the object wastewater containing the hardly decomposable harmful substances by means of a filtration equipment, a membrane separation method, etc., have been developed (refer to, for example, Japanese Unexamined Patent Application Laid-Open No. Hei 11-99395).

For the purpose of treating wastewater containing the hardly decomposable harmful substances as mentioned above, a filtration treatment, a bio-organic treatment or so is carried out as a pretreatment and then, an ozone treatment, an ultraviolet irradiation treatment, a catalyst treatment, an activated carbon treatment or so is carried out as an after-treatment. As thus described, it was necessary to decompose and remove the hardly decomposable harmful substances spending great labors and materials in the past.

Further, giving the ultraviolet irradiation treatment in example, it is a technology which can take advantage only about the reaction system in which the ultraviolet ray can transmit, and there is a problem that it cannot take advantage about solid or a liquid containing solid. Furthermore, it is necessary for the hardly decomposable harmful substances removed by the pretreatment to be processed specially into harmless in order to prevent the secondary contamination.

Accordingly, development of a decomposition treatment technology for these hardly decomposable harmful substances efficiently and without contaminating human body or surrounding environment again is eagerly desired.

DISCLOSURE OF THE INVENTION

An object of the present invention is to provide a method of treating wastewater containing hardly decomposable harmful substances which coagulates and separates the hardly decomposable harmful substances from wastewater and efficiently decomposes the separated hardly decomposable harmful substances in the solid condition.

As a result of intensive extensive research and investigation made by the present inventors in order for achieving the object, it has been found that a solid-liquid separation which separates a solid containing the hardly decomposable harmful substance from a liquid with a use of a coagulant, and decomposing the hardly decomposable harmful substance by bringing peroxide into contact with the separated solid achieve the object. Such being the case, the present invention has been accomplished on the basis of the foregoing findings and information.

Namely, the present invention provides:

(1) A method of treating hardly decomposable harmful substance comprising:
(A) a step for adding coagulant into wastewater containing a hardly decomposable harmful substance,
(B) a step for performing solid-liquid separation which separates a solid containing the hardly decomposable harmful substance from a liquid, and
(C) a step for decomposing the hardly decomposable harmful substance by bringing peroxide into contact with the separated solid;

(2) The method of treating hardly decomposable harmful substance according to the above item (1), wherein the hardly decomposable harmful substance is at least one kind selected from the group consisting of dibenzodioxin halides, dibenzofuran halides, polychlorinated biphenyls, benzene halides, alkylphenols, phenol halides, alkane halides, alkene halides, phthalic esters, bisphenols and polycyclic aromatic hydrocarbons;

(3) The method of treating hardly decomposable harmful substance according to the above item (1), wherein the coagulant employed in step (A) is at least one kind selected from the group consisting of polyacrylic acid, polyacrylamide resin, ferrous coagulant and aluminum-based coagulant;

(4) The method of treating hardly decomposable harmful substance according to the above item (3), wherein the ferrous coagulant is at least one kind selected from the group consisting of ferric sulfate, polyferric sulfate, ferric chloride and polyferric chloride;

(5) The method of treating hardly decomposable harmful substance according to the above item (3), wherein the aluminum-based coagulant is at least one of aluminum chloride and polyaluminum chloride;

(6) The method of treating hardly decomposable harmful substance according to the above item (1), further adding coagulation promoter in the step (A);

(7) The method of treating hardly decomposable harmful substance according to the above item (6), wherein the coagulation promoter is an inorganic porous material or an organic porous material;

(8) The method of treating hardly decomposable harmful substance according to the above item (6), wherein the coagulation promoter is at least one kind selected from the group consisting of ion exchange resin, diatom earth, activated clay, zeolite, pearlite and activated carbon;

(9) The method of treating hardly decomposable harmful substance according to the above item (1), wherein a filtration method, a centrifugal separation method or a membrane separation method is employed in the step (B);

(10) The method of treating hardly decomposable harmful substance according to the above item (1), wherein the peroxide used in the step (C) is an oxidizing agent;

(11) The method of treating hardly decomposable harmful substance according to the above item (10), wherein the oxidizing agent is at least one of persulfate and permanganate;

(12) The method of treating hardly decomposable harmful substance according to the above item (11), wherein the persulfate is at least one kind selected from the group consisting of ammonium persulfate, sodium persulfate and potassium persulfate;

(13) The method of treating hardly decomposable harmful substance according to the above item (11), wherein the permanganate is at least one of sodium permanganate and potassium permanganate;

(14) The method of treating hardly decomposable harmful substance according to the above item (1), wherein the peroxide used in the step (C) is at least one selected from the group consisting of salt of peroxo acid, hyperoxide and organic peroxide;

(15) The method of treating hardly decomposable harmful substance according to the above item (14), wherein the salt of peroxo acid is perborate or organic peroxide;

(16) The method of treating hardly decomposable harmful substance according to the above item (14), wherein the hyperoxide is at least one selected from the group consisting of potassium hyperoxide, sodium hyperoxide, barium hyperoxide and magnesium hyperoxide;

(17) The method of treating hardly decomposable harmful substance according to the above item (14), wherein the organic peroxide is ditertiarybutylperoxide or dicumyl peroxide;

(18) A method of treating hardly decomposable harmful substance comprising:

(a) a step for adding an adsorbent into wastewater containing a hardly decomposable harmful substance, (B) a step for performing solid-liquid separation which separates a solid containing the hardly decomposable harmful substance from a liquid, and (C) a step for decomposing the hardly decomposable harmful substance by bringing peroxide into contact with the separated solid;

(19) The method of treating hardly decomposable harmful substance according to the above item (18), wherein the adsorbent is at least one selected from the group consisting of ion exchange resin, diatom earth, activated clay, zeolite, pearlite, titania and activated carbon;

(20) A method of treating a hardly decomposable substance wherein the hardly decomposable substance adsorbed to a solid is brought into contact with peroxides in an amount of 100 moles or more per the hardly decomposable substance without conducting any desorption operation;

(21) The method of treating a hardly decomposable substance according to the above item (20), wherein the solid is any one of soil, sludge, incinerated ash or adsorbent;

(22) The method of treating hardly decomposable harmful substance according to the above item (20), wherein the hardly decomposable substance is at least one selected from the group consisting of dibenzodioxin halides, dibenzofuran halides, polychlorinated biphenyls, benzene halides, alkylphenols, phenol halides, alkane halides, alkene halides, phthalic esters, bisphenols and polycyclic aromatic hydrocarbons;

(23) The method of treating hardly decomposable harmful substance according to the above item (20), wherein the peroxide is at least one selected from the group consisting of salt of peroxo acid, hyperoxide and organic peroxide;

(24) The method of treating hardly decomposable harmful substance according to the above item (23), wherein the salt of peroxo acid is at least one selected from the group consisting of persulfate, permanganate, perborate and organic peroxide;

(25) The method of treating hardly decomposable harmful substance according to the above item (24), wherein the persulfate is at least one selected from the group consisting of ammonium persulfate, sodium persulfate and potassium persulfate;

(26) The method of treating hardly decomposable harmful substance according to the above item (24), wherein the permanganate is any one of sodium permanganate and potassium permanganate;

(27) The method of treating hardly decomposable harmful substance according to the above item (23), wherein the hyperoxide is at least one selected from the group consisting of potassium hyperoxide, sodium hyperoxide, barium hyperoxide and magnesium hyperoxide; and

(28) The method of treating hardly decomposable harmful substance according to the above item (23), wherein the organic peroxide is ditertiarybutylperoxide or dicumyl peroxide.

BRIEF DESCRIPTION OF THE DRAWINGS

In FIG. 1, reference numerals 1 to 9 indicate valves; reference numeral 10 indicates a bag filter; reference numeral 11 indicates a pressure gauge for measuring differential pressure of the filter; reference numerals 12 and 13 indicate pumps; reference numeral 14 indicates a heat exchanger; reference numeral 15 indicates a temperature controlling trap; and reference numeral 16 indicates a drain line for the wastewater.

THE PREFERRED EMBODIMENT TO CARRY OUT THE INVENTION

Figure 1:
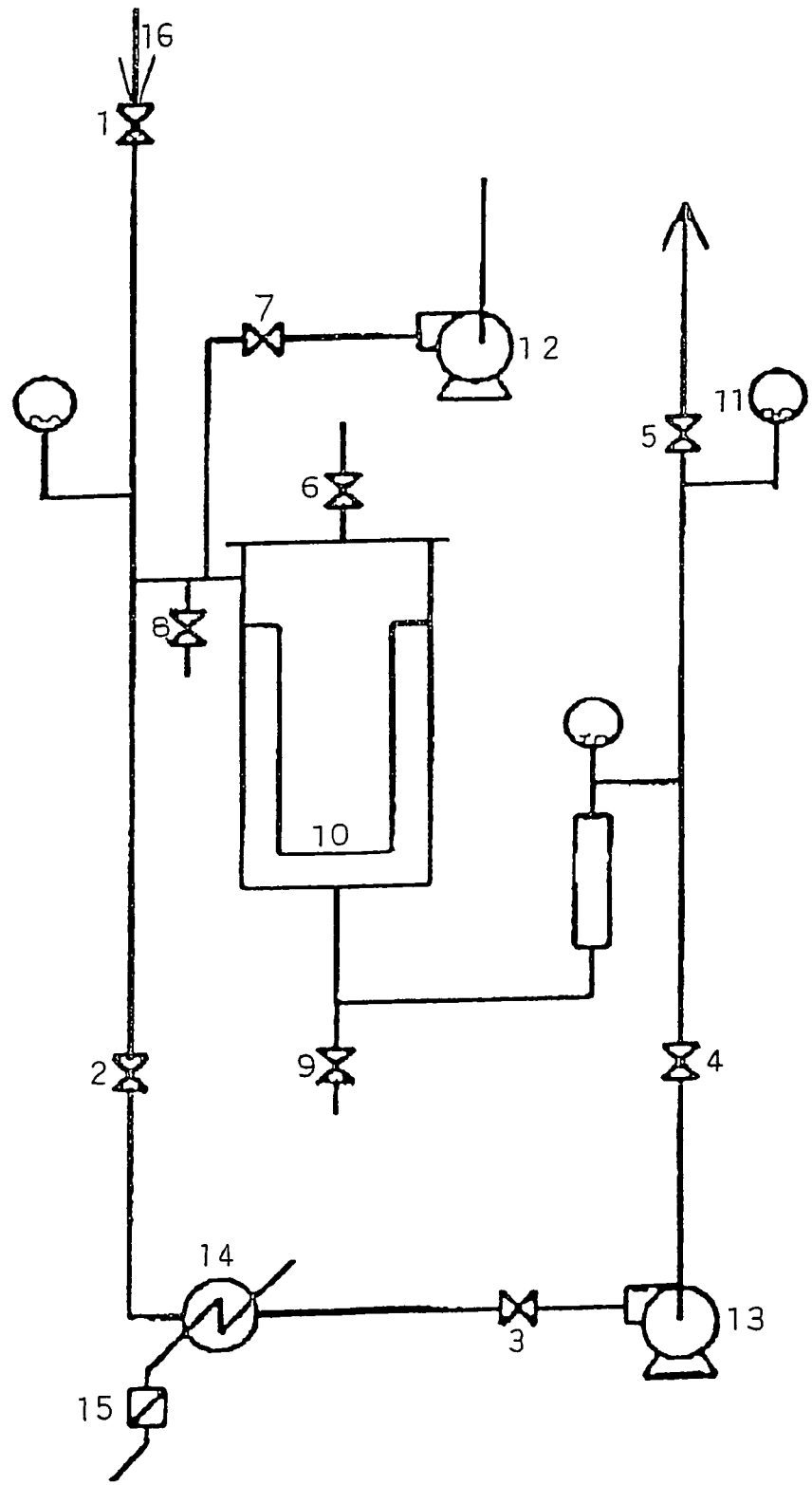
FIG. 1 illustrates a block diagram of a solid-liquid separator with a bag filter employed in Examples and Comparative Examples.

To begin with, the first aspect of the present invention provides a method of treating hardly decomposable harmful substance comprising (A) a step for adding coagulant into wastewater containing a hardly decomposable harmful substance; (B) a step for performing solid-liquid separation which separates a solid containing the hardly decomposable harmful substance from a liquid; and (C) a step for decomposing the hardly decomposable harmful substance by bringing peroxide into contact with the separated solid.

Examples of the hardly decomposable harmful substances in the method of treating wastewater containing hardly decomposable harmful substances (it may be described merely as "a method for treating wastewater" below) in the present invention include dibenzodioxin halides (dioxins), dibenzofuran halides, polychlorinated biphenyls (PCB), benzene halides, alkylphenols, phenol halides, alkane halides, alkene halides, phthalic esters, bisphenols and polycyclic aromatic hydrocarbons.

Typical examples of the dibenzodioxin halides include compounds such as 2,3,7,8-tetrachlorodibenzo-p-dioxin, 1,2,3,7,8-pentadichlorodibenzo-p-dioxin, 1,2,3,4,7,8-hexachlorodibenzo-p-dioxin, 1,2,3,4,6,7,8-heptachlorodibenzo-p-dioxin, 1,2,3,4,6,7,8,9-octachlorodibenzo-p-dioxin, etc.

Typical examples of the dibenzofuran halides include compounds such as 2,3,7,8-tetrachlorodibenzofuran, 1,2,3,7,8-pentachlorodibenzofuran, 2,3,4,7,8-pentachlorodibenzofuran, 1,2,3,4,7,8-hexachlorodibenzofuran, 1,2,3,6,7,8-hexachlorodibenzofuran, 1,2,3,7,8,9-hexachlorodibenzofuran, 2,3,4,6,7,8-hexachlorodibenzofuran, 1,2,3,4,6,7,8-heptachlorodibenzofuran, 1,2,3,4,6,7,8,9-octachlorodibenzofuran, etc.

As the polychlorinated biphenyls, there are Coplanar PCBs whose chlorine atom is substituted except at ortho position, specific examples include compounds such as 3,3',4,4'-tetrachloro biphenol, 3,3',4,4',5-pentachlorobiphenol, 3,3',4,4',5,5'-hexachloro biphenol, etc.

Typical examples of the benzene halides include compounds such as chlorobenzene, dichlorobenzene, trichlorobenzene, tetra chlorobenzene, pentachlorobenzene, haxachlorobenzene, etc.

Typical examples of the alkylphenols include compounds such as t-butylphenol, nonylphenol, octyl phenol, pentyl phenol, etc., and typical examples of the phenol halides include compounds such as chlorophenol, dichlorophenol, trichlorophenol, tetrachlorophenol, pentachlorophenol, etc.

Typical examples of the alkane halides or the alkene halides include compounds such as dichloropropane, trichloroethane, trichloroethylene, tetrachloroethylene, dichloroethylene, etc., and examples of the phthalic esters include compounds such as dibutyl phthalate, butyl benzyl phthalate, di-2-ethylhexylphthalate, etc.

Typical examples of the bisphenols include compounds such as 2,2-bis(4-hydroxyphenyl)propane(bisphenol A), 1,1-bis(4-hydroxyphenyl)cyclohexane, or so and typical examples of the heterocyclic aromatic hydrocarbons include benzopyrene, chrysene, benzanthracene, benzofluoranthene, picene, etc.

The method for treating wastewater of the present invention is preferably applied to the hardly decomposable harmful substances such as halogenated dibenzodioxines (dioxines), polychlorinated biphenyls (PCB), benzene halides, alkylphenols, phenol halides, bisphenols and dibenzofuran halides.

In the present invention it is desirable to preparedly adjust pH of the wastewater containing the hardly decomposable harmful substances within the range of from 6 to 12 before coagulating the hardly decomposable harmful substances by adding the coagulant to the wastewater as the step (A). When pH is lower than 6, pipes of processing apparatus may corrode and when pH exceeds 12, neutralization of the wastewater at the last step will become troublesome. Detailed explanation about a basic substance for adjusting pH will be described below in a term about the basic substance.

Carrying out the step (A), that is, adding the coagulant into the pH adjusted wastewater after completing the above pH adjustment will coagulate the hardly decomposable harmful substances.

Regarding with the coagulant employed for the present invention, ferrous-based and/or aluminum-based inorganic coagulant is preferable. Typical examples of the ferrous-based coagulant include ferric sulfate, polyferric sulfate, ferric chloride, polyferric chloride, etc., and typical examples of the aluminum-based coagulant include aluminum chloride, poly aluminum chloride, etc.

Further, organic coagulant such as polyacrylic acid, polyacrylamide-based polymer and so on may be also employed. The foregoing coagulant may be employed alone or in combination of two or more kinds thereof. The addition amount of the coagulant is not particularly restricted and it may be appropriately settled depending on the kind of the coagulant employed or the coagulation component amount in the wastewater, however, it is generally settled within the range of from 0.00001 to 10% by weight to the amount of the wastewater, preferably within the range of from 0.0001 to 1% by weight.

In the present invention, a coagulation promoter may be optionally employed in combination with the coagulant. Specific examples of the coagulation promoter employed in the present invention include an inorganic porous material such as diatom earth, zeolite, pearlite, activated clay and so on, or an organic porous material such as activated carbon, ion exchange resin, etc. The kind of the coagulation promoter may be selected depending on the wastewater to be treated. They may be used alone or in combination of two or more kinds thereof. The addition amount of the coagulation promoter is not particularly restricted and is appropriately settled depending on the kind of the coagulation promoter employed or on the amount of coagulation component in the wastewater.

As a method for adding the coagulation promoter, there are a precoat method forming a cake layer on a filter membrane beforehand and a body feed method which adds the promoter into the wastewater followed by filtering. In the precoat method, the addition amount may be decided from filtration area, and in the body feed method, the addition amount may be decided making a turbidity of wastewater in a rule of thumb.

The step (B) in the method for treating wastewater is a step for performing solid-liquid separation which separates a solid containing the hardly decomposable harmful substances from a liquid.

In the solid-liquid separation step, for example, a membrane separation method, a filtration method, a centrifugal separation method and so on are employable as the solid-liquid separation method. In the membrane separation method, various kinds of membrane such as a microfiltration (MF) membrane, an ultrafiltration (UF) membrane, a nanofiltration (NF) membrane, a reverse osmosis (RO) membrane, and so on are usable as the separation membrane. Among these, MF membrane and UF membrane are preferable because they are efficient even under low pressure and they are economic in the viewpoint of a cost.

As a material for MF membrane, each resin such as cellulose-base, polyamide-base, polysulfone-base, polypropylene-base, cellulose acetate-base, polyether sulfone-base, polyacrylonitrile-base and so on may be used.

Further, as a material for UF membrane, each resin such as polyamide-base, polysulfone-base, polypropylene-base, polyvinylpyrrolidone-base and so on may be also used similarly as the material for MF membrane. In addition to the above various membranes, a bag filter is used as preferred means.

On the other hand, a sand filtration method may be employable as filtration method, and a cross flow system may be employable as an entire filtration system.

The step (C) in the method for treating wastewater in accordance with the present invention is a step for decomposing the hardly decomposable harmful substances by bringing peroxide into contact with the separated solid. In the method for treating wastewater in accordance with the present invention, the hardly decomposable harmful substances coagulated into the above solid are able to be oxidatively decomposed in the state of solid by peroxide without carrying out desorption operation. Accordingly, the operation is easy and convenient, evading jeopardy of contaminating human body or surrounding environment again.

Examples of the peroxide employed in the present invention include permanganate, sodium peroxide, various metal salts such as barium peroxide, zinc peroxide, cadmium peroxide, potassium peroxide, calcium peroxide, chromium peroxide, etc., persulfate, hydrogen peroxide and ozone.

Preferred peroxides used as a favorable oxidizing agent are permanganate and persulfate.

Typical examples of permanganate include zinc permanganate, cadmium permanganate, potassium permanganate, calcium permanganate, silver permanganate, strontium permanganate, cesium permanganate, sodium permanganate, barium permanganate, magnesium permanganate, lithium permanganate, rubidium permanganate, etc.

Further, examples of the persulfate include ammonium persulfate, sodium persulfate, potassium persulfate, hydrogen persulfate potassium, lead persulfate and rubidium persulfate, however, persulfates such as ammonium persulfate, sodium persulfate and potassium persulfate are particularly preferable as an oxidizing agent. They may be used alone or in combination of two or more kinds thereof. Furthermore, the use amount of the peroxide is preferably 100-fold mole or greater, more preferably selected within a range from $10^4$-fold mole to $10^9$-fold mole and the most preferably selected within a range from $10^5$-fold mole to $10^8$-fold mole on the basis of mole number of the hardly decomposable harmful substances adsorbed by solid in reference.

Regarding with the addition amount of peroxide, it is different depending on pH of wastewater to be treated, however, in the case where promoting only reaction, the addition may be conducted only taking an oxidizability of persulfuric acid into consideration.

Further, it is preferable for peroxide to be brought into contact with the solid in the state of dissolved in the wastewater in order for promoting the decomposition and furthermore, other oxidizing agent such as, for example, hydrogen peroxide or ozone may be coexisted. Also, metal salt, metallic oxide or so may be coexisted.

Still further, an organic solvent may be appropriately added into the reaction system in order to more effectively conduct the decomposition reaction. As the organic solvent, any organic solvent selected from the group consisting of ketones having 3 to 6 carbon atoms, alcohols having 1 to 4 carbon atoms and carboxylate esters having 2 to 6 carbon atoms may be preferably employed. Among these, examples of the ketones having 3 to 6 carbon atoms include acetone, methylethyl ketone, diethyl ketone, methyl isobutyl ketone, etc. Further, examples of the alcohols having 1 to 4 carbon atoms include methylalcohol, ethyl alcohol, isopropanol, various butyl alcohols, ethylene glycol, propylene glycol, butylene glycol, etc. Furthermore, examples of the carboxylate esters having 2 to 6 carbon atoms include methyl formate, ethyl formate, methyl acetate, ethyl acetate, methyl propionate, ethyl propanate, methyl butyrate, butyric ester, methyl acrylate, ethyl acrylate, etc. Because these organic solvents have great affinity with water, they are capable of eluting the hardly decomposable harmful substances from inside of the solid to surface layer area of the solid.

Although persulfates heatedly decompose and generate hydrogensulfate ion radical, sulfate ion radical and hydroxyl radical, and the radical further decomposes decomposable harmful substances such as dioxin, etc., it is preferable to agitate after making the solid of the hardly decomposable harmful substances coagulated into a form of slurry in order to raise decomposition efficiency because the radical ejects electron by in a short time. The more violent the agitation is, the higher the probability that the radical and the hardly decomposable harmful substances come into contact with each other raises, and it is advantageous, however, it is preferable that the agitation is conducted within the range which does not become remarkably unfavorable in economic aspect regarding with a capacity of a decomposing container or viscosity of the slurry because the agitation has a limit.

Regarding with the reaction temperature for oxidative decomposition of the hardly decomposable harmful substances coagulated to the solid with the use of peroxide, it is preferably from room temperature to 100° C. The reaction temperature is more preferably within the range of from 40° C. to 100° C. When the reaction temperature is lower than 40° C., long time may be required for decomposition.

The higher the temperature for oxidative decomposition treatment, the faster the decomposition rate rises, however, the decomposition treatment at the temperature higher than the boiling temperature of water (when the salt concentration becomes high, the boiling temperature becomes higher than 100° C.) will require a pressure vessel, and accordingly, the decomposition treatment under atmospheric pressure at lower than the boiling temperature is preferable. Further, in the case where the decomposition treatment is conducted under the atmospheric pressure at the temperature of boiling temperature or higher, it becomes necessary to provide waste gas treatment facility for the aspect of preventing secondary contamination because, at an elevated temperature, the hardly decomposable harmful substances such as dioxin evaporate together with evaporation of moisture.

In an occasion of oxidative decomposition with the use of the above preferable persulfate in the present invention, for the purpose of maintaining pH to 6 or higher, preferably 7 or higher by neutralizing the generating sulfuric acid, and for the purpose of adjusting the decomposition reaction, it is profitable to oxidatively decompose under the existence of basic substance.

With regard to the above basic substance, it is important to select a compound without being oxidized by persulfates and without inducing secondary contamination in an occasion of transferring the treated slurry towards an ultimate disposal place such as a landfill, or of disposal. One or more kinds appropriately selected from hydroxide, oxides and slightly acid salt of alkali metal or alkaline earth metal; ammonia and organic base compounds is used as the basic substance.

Preferable examples of the hydroxide of the alkali metal or the alkaline earth metals include hydroxides of sodium, potassium, calcium, etc., and preferable examples of the oxide of the alkali metals or alkaline earth metals include sodium oxide, potassium oxide, calcium oxide, barium oxide, sodium hyperoxide, potassium hyperoxide, calcium hyperoxide, barium hyperoxide, etc. Among the above compounds, the hyperoxides are preferable because they have functions as an oxidizing agent. Further, preferable examples of slightly acidic salt of alkali metal or alkaline earth metal include sodium carbonate, potassium carbonate, sodium hydrogen carbonate, potassium hydrogen carbonate, sodium phosphate, potassium phosphate, etc., and the organic base compound are various kinds of amines.

These basic substances may be preparedly added into the solids, or may be added during the reaction little by little. In this way, maintaining pH of decomposing reaction solution to 6 or higher, preferably 7 or higher enables to employ a cheap reaction container made of iron without requiring to employ an expensive anticorrosion reaction container.

In the present invention, heating method is not particularly restricted in an occasion of adding heat, and any one of an electric heater type, a heated water feed type, a steam suction type, a boiler type and so on may be employable, however, it is necessary to be careful about the heated water type that the water content should not become too much. Too much moisture content will reduce persulfate concentration for the reaction. With regard to treating time for oxidative decomposition, it is unable to settle in a wholesale manner because it depends on the treating temperature or other condition, however, it is usually from 10 minutes to about 50 hours.

Additionally, in the case where the hardly decomposable harmful substances strongly coagulate with the solid such as inorganic substances, it is desirable to oxidatively decompose the hardly decomposable harmful substances by preparedly bringing persulfates into contact with the solid and permeating them among the solid followed by heating or so.

By the employment of the above oxidative decomposition treatment condition, favorable effects such as easy operation, or evading jeopardy of contaminating human body or surrounding environment again based on the following merits: (1) it enables to reduce a use amount of persulfate; (2) it enables to shorten a reaction time; (3) it enables to lower a reaction temperature; (4) it enables to prevent corrosion of a reaction container; (5) it enables to carry out oxidative decomposition treatment with a cheap reaction container made of iron; and (6) it enables to oxidatively decompose the hardly decomposable harmful substances in a state of a solid.

Additionally, a slight amount of dioxin may be contained among a solution layer separated from a solid. In such a case, ozonization, ultraviolet irradiation treatment, catalyst treatment or activated carbon treatment may be applicable to the solution layer resultantly decomposing or adsorbing the remaining slight amount of dioxin.

Next, the second aspect of the present invention provides a method of treating hardly decomposable harmful substance comprising (a) a step for adding adsorbent into wastewater containing a hardly decomposable harmful substance; (B) a step for performing solid-liquid separation which separates a solid containing the hardly decomposable harmful substance from a liquid; and (C) a step for decomposing the hardly decomposable harmful substance by bringing peroxide into contact with the separated solid.

Namely, it provides (a) a step for adding adsorbent into wastewater containing a hardly decomposable harmful substance instead of a step for adding coagulant into wastewater containing a hardly decomposable harmful substance in the first aspect of the present invention.

Additionally, (B) a step for performing solid-liquid separation which separates a solid containing the hardly decomposable harmful substance from a liquid; and (C) a step for decomposing the hardly decomposable harmful substance by bringing peroxide into contact with the separated solid may be carried out in the same manner as the foregoing first aspect of the present invention.

Similarly as the step (A) in the present invention, it is desirable to preparedly adjust pH of the wastewater containing the hardly decomposable harmful substances within the range of from 6 to 12 before adsorbing the hardly decomposable harmful substances by adding the adsorbent to the wastewater as the step (a). When pH is lower than 6, pipes of the processing apparatus may corrode and when pH exceeds 12, neutralization of the wastewater at the last step will become troublesome.

Carrying out the step (a), that is, adding the adsorbent into the pH adjusted wastewater after completing the above pH adjustment will adsorb the hardly decomposable harmful substances.

Regarding with a kind of adsorbent employed in the step (a), the same inorganic porous materials and organic porous materials which are the coagulation promoter employable in the foregoing first aspect may be employed appropriately. Further, titania (titan oxide) may be employed as the adsorbent. Concrete examples of the inorganic porous materials include zeolite, diatom earth, activated clay, etc., and concrete examples of the organic porous materials include activated carbon, ion exchange resin, etc. They may be used alone or in combination of two or more kinds thereof. Titania, activated carbon, diatom earth and ion exchange resin are preferable among the adsorbents. Particularly, the activated carbon whose diameter of mesopore occupying the entire pore volume is 2 to 50 nm, macropore is 50 nm or greater, and whose pore volume is 0.15 liter/g or more, preferably 0.20 liter/g or more, and further preferably 0.25 liter/g or more is favorably applicable.

Examples of the activated carbon onto which the hardly decomposable harmful substances adsorbed include the following: (1) a mixture consisting of suspended matters and activated carbons having adsorbed dioxin obtained by cleaning gas exhausted from incinerator plant facilities with scrubber and by conducting adsorptive treatment to the wastewater after the cleaning with the use of activated carbon; (2) activated carbons having adsorbed dioxin obtained by cleaning exhaust gas which generates when reproducing aluminum, zinc, iron, etc., with scrubber and by conducting adsorptive treatment to sludge after separating solid from the cleaning water and to wastewater after removing sludge with the use of activated carbon; (3) a mixture consisting of suspended matters and activated carbons having adsorbed substance obtained by conducting adsorptive treatment to wastewater from such as chloroethylene production plant or epoxy resin production plant with activated carbon; and (4) activated carbons having adsorbed substance obtained by conducting adsorptive treatment to phenols in alkali cleaning wastewater drained from production plant of various alkylphenols with activated carbon.

The adsorbent such as diatom earth or ion exchange resin to which the hardly decomposable harmful substances were adsorbed are capable of reducing the content of hardly decomposable harmful substances of itself to a range sufficiently safe for reuse by means of the above-mentioned decomposition technique. Therefore, after once using the adsorbents for adsorption of the hardly decomposable harmful substances, the adsorbents are capable of being repeatedly used without disposing promptly and until degradation of their properties as adsorbent occurs. Accordingly, they enable to treat wastewater as closed system, they exhibit extremely high safety and they are economic. Further, even in the case where the adsorbents for the hardly decomposable harmful substances are finally disposed, it is possible to dispose after reducing residue amount of the hardly decomposable harmful substances sufficiently, without giving adverse effect to natural environment.

Furthermore, the present invention is applicable to solid being adsorbed by the hardly decomposable substances. Namely, by applying the step (C) in the foregoing first aspect to the solid onto which the hardly decomposable substances were adsorbed, a method for decomposing the hardly decomposable substances can be provided.

The present invention is favorably applicable to solid being adsorbed by the hardly decomposable substances, for example, soil, sludge, adsorbent and incinerated ash being adsorbed by the hardly decomposable substances.

Examples of the soil being adsorbed by the hardly decomposable substances include contaminated soil caused by ground-water containing hardly decomposable substances or by leachate from a landfill. Examples of the sludge being adsorbed by the hardly decomposable substances include suspended matters being adsorbed by dioxin obtained by separating and collecting suspended matters in effluent drained from each facility in factory and place of business, and sludge being adsorbed by dioxin obtained by separating and collecting sludge from cleaning liquid after cleaning, with the use of a scrubber, exhaust gas which generates in an occasion of renewing waste catalyst discharged from a cleaning apparatus for exhaust gas discharged from metal refining factory, etc.

Examples of the adsorbent being adsorbed by the hardly decomposable substances include inorganic porous material, organic porous material, titania (titan oxide), etc. Examples of the inorganic porous material include zeolite, diatom earth, activated clay, etc.

Further, examples of the organic porous material include activated carbon, ion exchange resin, etc.

Still further, examples of the incinerated ash being adsorbed by the hardly decomposable substances include incinerated ash being adsorbed by the hardly decomposable substances discharged after incinerating general garbage or industrial garbage such as normal family life base wastes or business base wastes.

The hardly decomposable substances adsorbed onto the above solid are able to be oxidatively decomposed by bringing them into contact with peroxides of 100-fold mole or more to the hardly decomposable substances without carrying out desorption operation. However, before or after bringing them into contact with the above peroxide, a contact treatment of bringing them into contact with microorganism and/or enzyme, or a contact treatment of bringing them into contact with oxalate and/or oxalate salt may be optionally conducted.

The treatment by the microorganism or the enzyme will be explained below.

With regard to the microorganism used in the pre-treatment, mold is preferably employed. Typical example of the mold belongs to *Trametes* genus, *Schizophyiium* genus, *Phanerochaete* genus, *Bjerkandera* genus, *Irpex* genus, *Pleurotus* genus, *Myceliophthora* genus, *Lentinera* genus, *Pycnoporus* genus, *Lentinus* genus, *Rhizoctonia* genus, *Funalla* genus, *Merulius* genus, *Myceliophthora* genus, *Coprinus* genus, *Agaricus* genus, *Phoriota* genus, *Flammulona* genus, *Ganoderma* genus, *Daedaieopsis* genus, *Favolus* genus, *Lyophyllum* genus, *Auricularia* genus, *Gloeophyllum* genus, *Tyromyces* genus, *Coniophora* genus, *Heterobasidion* genus, *Fomes* genus, *Chaetomium* genus, *Myceliophthora* genus, *Neurospora* genus, *Sclerotium* genus, *Humicola* genus, *Monilia* genus, *Xylalia* genus, *Cladorrhinum* genus, *Graphium* genus, *Scopularipsis* genus, *Sphaeropsis* genus, *Fusarium* genus, *Trichoders* genus, *Botrytis* genus, *Aspsrgillus* genus, etc. Among these molds, woods decay fungus belonging to *Trametes* genus, *Schizophyllum* genus, *Phanerochaets* genus, *Bjerkandera* genus, *Irpex* genus, *Pleurotus* genus, *Myceliophthora* genus, *Lentinera* genus and *Pycnoporus*) genus are particularly preferable.

On the other hand, at least one kind particularly selected from among cellobiose dehydrogenase, xanthine oxidase, laccase, lignin peroxidase and manganese peroxidase is preferably employed as the enzyme. With regard to the enzyme, those enzyme either which microorganism ejected after production or which are contained in natural product each separated from incubation broth and natural product with the use of ion exchange resin or so may be employed, and a mixture of viable fungus of microorganism and enzyme may be employed. In the case where the enzymes are employed, it is effective that, in an occasion of contacting with hardly decomposable substances, the contact should be conducted either under the existence of electron donor or hydrogen peroxide or under the existence of microorganism or enzyme each producing hydrogen peroxide. Further, when laccase is employed as enzyme, it is preferable to add a mediator in order to reveal its activity ultimately. Phenolic compounds such as 1-hydroxybenzotriazole and so on or aniline-based compounds such as 2,2-azino bis(3-ethylbenzthiazoline-6-sulfonic acid) are preferably employed as the mediator.

With regard to a method for incubating the mold, the same method for usually incubating microorganism may be applicable. For example, in a little incubation, incubating at the temperature of around 10 to 50° C. for 5 to 30 days on malt-yeast incubation medium may be appropriate. Further, in the case of incubating in large quantities, either a liquid incubation with the use of a tank or a solid incubation with the use of solid component of plant derivation such as sawdust, all graining of wheat or barley, bran or so, or with the use of inorganic porous carrier impregnated with sugar, nitrogen, phosphorus, mineral and so on may be conducted under the above condition. In this occasion, when the incubation temperature is lower than 10° C., propagation of microorganism becomes slow and the amount of emitting enzyme decreases. Further, when the incubation temperature exceeds 50° C., there will be a fear that growing proliferation of microorganism becoming slow.

Moreover, it is preferable to adjust pH during incubation to 3 or higher, and further; it is more preferable to adjust pH to 3.5 or higher. When pH during incubation is lower than 3, the amount of emitting enzyme from microorganism becomes slow and it falls outside the range of optimum pH of enzyme. In this condition, corrosion will appear at inside of incubation container made of iron. Furthermore, in the incubation of the microorganism, a bacterial concentration of incubated microorganism might fall $1 \times 10^2$ cfu (a colony formation unit) per plant organic matter dry weight 1 g or greater, preferably within a range of from $1 \times 10^2$ to $1 \times 10^8$ cfu, and more preferably within a range of from $1 \times 10^3$ to $1 \times 10^7$ cfu. Moreover, on the occasion of incubation of the mold, either mycelium or spore may be employed, however, mycelium is usually employed because of easiness in incubation.

When the microorganism and/or the enzyme is brought into contact with the hardly decomposable substances adsorbed to solid, it is preferable to bring the microorganism and/or the enzyme into contact under an aseptic condition after a sterilization treatment of saprophyte adhering to the solid beforehand. Various saprophytes usually habitate among the solid to which the hardly decomposable substances are adsorbed, and accordingly, by conducting sterilization treatment to the saprophytes, a favorable condition for a growth of useful microorganism after inoculating useful microorganism will be arranged.

With regard to a method for the sterilization treatment, a heat treatment method, a chemical treatment method or a physical treatment method may be applied. In the case where the heat treatment method is employed for conducting the sterilization treatment to the saprophytes, the treatment might be conducted at the temperature of around 80 to 125° C. Although a heat treatment time is different depending on the treatment temperature, it might fall within a range of from 2 seconds to around 6 hours. Because almost all the saprophytes extinct at the temperature of 125° C., the heat treatment does not to be conducted at the temperature exceeding it.

Further, in the case where the chemical treatment method is employed for the sterilization treatment, ethyl alcohol, diethyl dicarbonate, hydrogen peroxide, persulfate, hypochlorous acid, hydrochloric acid, ethylene oxide, ozone or chloropicrin is employable as a sterilization treatment agent. The treatment agents may be directly used; however, a solution obtained by using diluents such as water may be used. For example, in the case where ethyl alcohol is employed, an aqueous solution of it with a concentration of around 60 to 100 g/100 milliliter is preferably used. Further, in the case where hydrogen peroxide is employed, an aqueous solution of it with a concentration of less than 30 g /100 milliliter is preferably used, and a mixed aqueous solution with ethyl alcohol may be used. With regard to the physical treatment method, a method in accordance with an ultraviolet irradiation treatment is preferably used.

Moreover, in an occasion of the decomposition treatment of bringing hardly decomposable substances adsorbed to solid into contact with microorganism and/or enzyme, a propagation of saprophytes may be suppressed by urging a useful microorganism to grow selectively, aside from the sterilization treatment. For example, in the case where wood decay fungus are employed as the microorganism, a use of a cellulose source as a carbon source, preferably a use of carboxymethyl cellulose, water-soluble cellulose ether, phosphorylation cellulose and so on which are each soluble cellulose source respectively is capable of suppressing propagation of saprophytes because these carbon sources do not contribute to propagate saprophytes.

In the case where the hardly decomposable substances adsorbed to the solid sterilized by the heat treatment method, chemical treatment method or physical treatment method are decomposed being brought into contact with microorganism, a method of incubating the microorganism under the existence of the solid is desirable.

With regard to a condition in the occasion of conducting decomposition reaction of hardly decomposable substances by the microorganism, it is similar with the growth condition of the microorganism. Namely, the temperature is about 10 to 50° C., preferably 15 to 35° C., and pH is 3 or higher, preferably 3.5 or higher. Further, because the above mold is aerobic microorganism, the decomposition reaction should be conducted while supplying a little amount of gas containing enzyme, preferably air to a decomposition reaction device. As mentioned above, the incubation of microorganism under the existence of the hardly decomposable substances adsorbed to the solid will contribute to advance the decomposition reaction of the hardly decomposable substances because the incubation emits an enzyme capable of decomposing hardly decomposable substances and a radical capable of decomposing hardly decomposable substances outside the bacterial cell.

Furthermore, in order to conduct the decomposition reaction more effectively, it is preferable to carry out the decomposition reaction under the existence of nutrition source for the mold employed in the reaction. There are various substances as the nutrition sources, and examples include saccharides such as glucose or so, carbon source such as potato extract or molasses, nitrogen source such as ammonium salt or urea, and water-soluble nutrition source such as corn steep liquor, meat extract, yeast extract or peptone. Moreover, corns such as barley and wheat, rice or corn; and their side-products such as bran, rice bran, cone broth, Okara and so on may be used as the nutrition sources. Still further, wood chips, fiber of coconut, skin of citrus or porous clay mineral may be added. With regard to the addition amount of the nutrition source, in an occasion that the nutrition source is water-soluble and easy to be adsorbed the solid, the addition amount is about 0.01 to 10% by weight of the solid. In an occasion that the nutrition source is solid and hardly adsorbed to the adsorbent, the addition amount is about 0.001 to 10% by weight to the adsorbent.

Still further, an organic solvent may be appropriately added into the reaction system in order to more effectively conduct the decomposition reaction. As the organic solvent, any organic solvent selected from the group consisting of ketones having 3 to 6 carbon atoms, alcohols having 1 to 4 carbon atoms and carboxylate esters having 2 to 6 carbon atoms may be preferably employed. Typical examples of the ketones having 3 to 6 carbon atoms include acetone, butanone, diethyl ketone, methyl isobutyl ketone, etc. Typical examples of the alcohols having 1 to 4 carbon atoms include methylalchol, ethylalcohol, isopropyl alcohol, various butylalcohols, ethylene glycol, propylene glycol, butylene glycol, etc. Typical examples of the carboxylate esters having 2 to 6 carbon atoms include methyl formate, ethyl formate, methyl acetate, ethyl acetate, methyl propionate, ethyl propanoate, methyl butyrate, butyric ester, methyl acrylate, ethyl acrylate, etc. The above-mentioned organic solvents have great affinity with water, and accordingly, the hardly decomposable substances in the state of eluted from inside of the solid to surface layer of the solid are effectively brought into contact with the microorganism or the enzyme without decreasing activity of the microorganism and the enzyme. Furthermore, together with the organic solvent, an addition of solvent such as liquid n-paraffins, cycloparaffins, higher fatty acid esters at an ordinary temperature enables to prevent re-adsorption of the hardly decomposable substances to the inside of the solid. Typical examples of the solvent for preventing re-adsorption include n-decane, n-undecane, n-dodecane, n-tridecane, n-tetradecane, n-pentadecane, n-hexadecane, cyclooctane, cyclodecane, methyl oleate, ethyl oleate, methyl linoleate, ethyl linoleate, methyl linolenate, ethyl linolenate, etc.

In the decomposition method of hardly decomposable substances of the present invention, after the pretreatment of optionally bringing microorganism or enzyme into contact with the hardly decomposable substances adsorbed in solid, the hardly decomposable substances are oxidatively decomposed by contacting with peroxides. Further, it is possible to decompose the hardly decomposable substances by bringing them into contact with the microorganism or the enzyme after bringing them into contact with the peroxides.

The contact between the hardly decomposable substances adsorbed to the solid and peroxides is executed in the state that the hardly decomposable substances were adsorbed to the solid without substantially passing through a desorption treatment to make them elute from the solid. In order to effectively conduct the decomposition of the hardly decomposable substances in the above, the addition amount of the peroxide might be settled to 100-fold mole or greater, preferably settled to from $10^4$ to $10^9$-fold mole and more preferably settled to from $10^5$ to $10^8$-fold mole on the basis of mole number of the hardly decomposable harmful substances adsorbed to the solid.

In the oxidative decomposition, at least one kind of peroxide selected from the group consisting of salt of peroxo acid, hyperoxide and organic peroxide is preferably employed.

The salt of peroxo acid in the present invention is not particularly specified as far as it is safely handled, and examples include various compounds such as persulfate, permanganate, perborate, organic persalt, etc. Specific compounds of the salt of peroxo acid include persulfates such as ammonium persulfate, sodium persulfate, potassium persulfate, hydrogen persulfate potassium, etc.; permanganates such as sodium permanganate, potassium permanganate, calcium permanganate, etc.; perborates such as sodium perborate, potassium perborate, etc.; organic persalts such as peracetic acid sodium, perbenzoic acid sodium, perphthalic acid sodium, etc.

The hyperoxides are not particularly restricted and examples include various compounds such as potassium hyperoxide, sodium hyperoxide, barium hyperoxide, magnesium hyperoxide, etc.

Further, the organic peroxides are not particularly restricted and examples are various compounds including ketone peroxides such as acetylacetone peroxide, butanone peroxide, 3,3,5-trimethylcyclohexanone peroxide, etc.; diacyl peroxides such as octanoil peroxide, benzoyl peroxide, lauroyl peroxide, 3,5,5-trimethyl hexanoyl peroxide, etc.; hydro peroxides such as t-butylhydro peroide, cumenhydro peroxide, 2,5-dimethylhexane-2,5-dihydro peroxide, etc.; dialkyl peroxide such as di-t-butyl peroxide, dicumyl peroxide, 2,5-dimethyl-2,5-di(t-butyl peroxyl)hexan, etc.; peroxyl ketals such as 1,1-bis-t-butyl peroxyl-3,3,5-trimethylcyclohexane, 2,2-bis(t-butyl peroxyl)butane, etc.; alkyl per esters such as t-butyl peroxyl octate, t-butyl peroxyl pivaleate, t-butyl peroxyl benzoate, etc.; and peroxyl carbonates such as di-2-ethylhexyl peroxyl dicarbonate, bis(4-t-butylcyclohexyl)peroxyl dicarbonate, t-butyl peroxyl isopropyl carbonate, etc. Among these, di-t-butyl peroxide and dicumyl peroxide are preferably employed.

In the present invention, the above peroxide may be used alone or in combination of two or more kinds thereof.

In the present invention, the hardly decomposable substances pretreated with hardly decomposable substances, microorganism or enzyme adsorbed to the solid are oxidatively decomposed by the above peroxides just in the state of being adsorbed to the solid without substantially eluting them. In the above decomposition, the hyperoxides are usable in the form of powder, aqueous solution or organic solvent solution depending on their form such as soil, sludge or incinerated ash, or depending on the character of the hyperoxide. In the case where the hyperoxides are used in the form of the aqueous solution or in the form of the organic solvent solution, the concentration is preferably 0.1% by weight or greater. When the concentration is under 0.1% by weight, a large quantity of solution containing the hyperoxide will be needed and resultantly cause an inconvenience that a treatment container enlarges.

With regard to the contact treatment between the hardly decomposable substances and the hyperoxides, an oxidative decomposition bringing them into contact at pH 3 or higher, preferably at pH 3.5 or higher is advantageous.

Further, the temperature of the oxidative decomposition treatment bringing powdery peroxides or solution peroxide into contact with the hardly decomposable substances either adsorbed to the solid, or pretreated with microorganism or enzyme might be appropriately settled depending on the kind of the peroxide used, however, it usually falls within the range of 20 to 200° C. and preferably 80 to 180° C. In the present invention, heating method is not particularly restricted in an occasion of adding heat, and any one of an electric heater type, a heated water feed type, a steam suction type, a boiler type and so on may be employable, however, it is necessary to be careful about the heated water type that the water content should not become too much. Too much moisture content will reduce peroxide concentration for the reaction. With regard to treating time for oxidative decomposition, it is unable to settle in a wholesale manner because it depends on the treating temperature, the kind of the peroxide used or so, however, it is usually from 10 minutes to around 30 days.

Additionally, in the case where the hardly decomposable substances strongly adsorb to the solid such as active carbons or so, it is desirable to oxidatively decompose the hardly decomposable substances by preparedly bringing peroxides into contact with the solid sufficiently and permeating them among the solid followed by heating or so. Organic peroxide which easily permeates into activated carbon is more preferable to the decomposition of hardly decomposable substances adsorbed especially to the activated carbon.

Furthermore, in the decomposition of the hardly decomposable substances absorbed onto the activated carbons, heating after preparedly adsorbing hyperoxides such as potassium hyperoxide, sodium hyperoxide, barium hyperoxide or so each dissolved into an organic solvent respectively onto the activated carbon is also effective.

Additionally, when the solid onto which the hardly decomposable substances were adsorbed have a strong sticking property, for example, when sludge containing both incinerated ash discharged from incineration furnace and activated carbon are decomposed, powdering the solid with grinder and simultaneously adding and mixing powdery peroxides into the sludge followed by the heat treatment is advantageous.

The present invention shall be explained below in further details with reference to examples, but the present invention shall by no means be restricted by the following examples.

EXAMPLES

Example 1 and Comparative Example 1

An aqueous solution of poly aluminum chloride as a coagulant was continuously added by injection in an amount of 1 ppm as poly aluminum chloride content into the wastewater containing dioxin flowing at a flow rate of 1 m³/hr, and the resultant solution was filtered for 1 hour through a solid-liquid separator having a capacity of 10 L and equipped with a bag filter having membrane area of 0.25 m². After the filtration, a part of the coagula which stuck to filter was gathered by means of a spatula, mixed enough, and after drying, an amount of dioxin was measured and determined as a blank (Comparative Example 1).

Further, 1 kg of sodium persulfate, 600 g of sodium hydroxide were thrown into water in an amount of up to 10 L, which was reacted for 6 hours in the solid-liquid separator with the state that the coagula stuck to bag filter, keeping the temperature within the range of from 80 to 95° C. After the reaction, a part of the coagula which stuck to the filter was gathered by means of a spatula, mixed enough, and after drying, an amount of dioxin residue was measured (Example 1). The measurement results are shown in Table 1. The results verify that high decomposition ratio was exhibited about the coagula.

TABLE 1

| Sample Condition | Measured amounts of Dioxin (ng/gdry) | Decomposition ratio (%) |
| --- | --- | --- |
| Comparative Example 1 | 50 | — |
| Example 1 | 5 | 90 |

The solid-liquid separator equipped with the bag filter was manipulated as follows. Explanation will be described referring to FIG. 1. FIG. 1 illustrates a block diagram of a solid-liquid separator with a bag filter employed in Examples and Comparative Examples.

(1) Solid-Liquid Separation Step (Filtration Concentration Step)

Valves 1, 5 and 6 were opened and valves 2, 4, 7, 8 and 9 were closed. Valve 6 was filled with the solution and then, turned to a closed state. With the use of pump 12, the coagulant was injected into drain line 16 through valve 7 before entering into bag filter 10. This system was designed for introducing the wastewater into the solid-liquid separator utilizing a fall of drain line 16.

(2) Step for Decomposing Hardly Decomposable Substance (Reaction Step)

Also with the use of pump 12, after opening valves 6 and 7 and closing other valves, a reagent was injected from a reagent tank by operating pump 12. After the injection of the reagent, closing valves 6 and 7 and opening valves 2, 3 and 4, further operating pump 13, the solution was cycled and heated by means of heat exchanger 14, and resultantly reacted.

Additionally, reference numeral 11 indicates a pressure gauge and reference numeral 15 indicates a temperature controlling trap.

Example 2 and Comparative Example 2

A suspension containing 250 g/L of diatom earth was poured in an amount of 1 L through valve 6 into solid-liquid separator having a capacity of 10 L and equipped with a bag filter having a membrane area of 0.25 m$^2$, and as a result, the surface of the bag filter was precoated with diatom earth only by filtering the suspension. Subsequently, an aqueous solution of poly aluminum chloride was continuously added by injection in an amount of 1 ppm as poly aluminum chloride content into the wastewater containing dioxin flowing at a flow rate of 1 m$^3$/hr for 3 hours, thereby filtered the resultant wastewater. After the filtration, a container of the bag filter was opened up and a part of a cake was sampled from the filter, and after drying, an amount of dioxin was measured and determined as a blank (Comparative Example 2).

Further, an aqueous solution combining 1.5 Kg/5 L of sodium persulfate and 1 kg/5 L of sodium hydroxide, an aqueous solution of sodium persulfate in an amount of 5 L and an aqueous solution of sodium hydroxide in an amount of 5 L were thrown in this order into the solid-liquid separator with the state that the coagula stuck to bag filter. Then, keeping the temperature within a range of 70 to 80° C., a decomposition reaction of the resultant solution was carried out for 7 hours. After the termination of the reaction, a part of the reactant was sampled and after drying, an amount of dioxin residue was measured (Example 2).

Example 3 and Comparative Example 3

Comparative Example 3 was conducted in a similar manner as Comparative Example 2 except that an aqueous solution of poly aluminum chloride as a coagulant was continuously added by injection in an amount of 1 ppm as poly aluminum chloride content into the wastewater and an aqueous solution of polyferric sulfate was also continuously added by injection in an amount of 10 ppm as polyferric sulfate content into the wastewater (Comparative Example 3).

Further, the decomposition reaction was carried out in the same mnner as Example 2 about the sample obtained in Comparative Example 3 (Example 3). The measured data about the amount of dioxin each in Comparative Examples 2 and 3 and Examples 2 and 3 are shown in Table 2 respectively.

TABLE 2

| Sample Condition | Measured amounts of Dioxin (ng/gdry) | Decomposition ratio (%) |
| --- | --- | --- |
| Comparative Example 2 | 58.6 | — |
| Example 2 | 1.8 | 96.9 |
| Comparative Example 3 | 60.7 | — |
| Example 3 | 1.2 | 98.0 |

Example 4 and Comparative Example 4

Pouring 100 ml of water containing dioxin into two centrifuge tubes made of polytetrafluoroethylene each having volume of 300 ml, and adding poly aluminum chloride and ferric sulfate each as coagulants in an amount that they each correspond to 2 ppm and 10 ppm respectively, and then, they were left standing for 16 hours. Subsequently, centrifugal separation was conducted with acceleration of 8000 G for 10 minutes. The content of one centrifuge tube was divided into supernatant and sediment as in Comparative Example 4, and a dioxin concentration was measured about each of them. Adding 100 ml of deionized water, 10 g of ammonium persulfate and 6 g of sodium hydroxide into the sediment in the other centrifuge tube, they were reacted keeping the temperature within a range of 85 to 95° C. for 7 hours. The reaction was named as Example 4 and a dioxin concentration was measured about the reactant. The results are shown in Table 3.

TABLE 3

| Sample Condition | Category | Measured amounts of Dioxin (ng/gdry) | Decomposition ratio (%) |
| --- | --- | --- | --- |
| Comparative Example 4 | Supernatant | Under analytical sensitivity | — |
| | Sediment | 14 | — |
| Example 4 | Sediment after decomposition | 0.11 | 99.2 |

Examples 5 to 8 and Comparative Examples 5 to 8

Examples 5 to 8 and Comparative Examples 5 to 8 are carried out in the same manners as Example 4 and Comparative Example 4 except that the coagulants are replaced to various ferrous coagulants shown in Table 4. The measured data about the amount of dioxin are shown in Table 4.

TABLE 4

| | | Addition amount (ppm) of coagulant (Main component) | Amounts of Dioxin (ng/gdry) | | |
|---|---|---|---|---|---|
| | | | Supernatant | Coagula (ng) | Decomposed substance (ng) |
| Comparative Example 5 | Ferric sulfate | 60 | Under analytical sensitivity | 20.5 | — |
| Example 5 | | | — | — | 1.0 |
| Comparative Example 6 | Polyferric sulfate | 60 | Under analytical sensitivity | 10.5 | — |
| Example 6 | | | — | — | 0.6 |
| Comparative Example 7 | Ferric chloride | 60 | Under analytical sensitivity | 19.0 | — |
| Example 7 | | | — | — | 1.0 |
| Comparative Example 8 | Polyferric chloride | 60 | Under analytical sensitivity | 14.5 | — |
| Example 8 | | | — | — | 0.7 |

Examples 9 to 12 and Comparative Examples 9 to 12

Examples 9 to 12 and Comparative Examples 9 to 12 are carried out in the same manners as Example 4 and Comparative Example 4 except that the coagulants are combinedly employed of various kinds shown in Table 5. The results are shown in Table 5.

TABLE 5

| | Combination and addition amount of coagulants | | Amounts of Dioxin (ng/gdry) | | |
|---|---|---|---|---|---|
| | | | Supernatant | Coagula (ng) | Decomposed substance (ng) |
| Comparative Example 9 | Ferric sulfate Polyacrylic acid | 30 ppm 3 ppm | Under analytical sensitivity | 17.5 | — |
| Example 9 | | | — | — | 0.06 |
| Comparative Example 10 | Polyferric sulfate Polyaluminum chloride Polyacrylic acid | 20 ppm 5 ppm 1 ppm | Under analytical sensitivity | 15.5 | — |
| Example 10 | | | — | — | 0.03 |
| Comparative Example 11 | Ferric chloride Polyaluminum chloride Polyacrylic acid | 40 ppm 4 ppm 3 ppm | Under analytical sensitivity | 13.5 | — |
| Example 11 | | | — | — | 0.7 |
| Comparative Example 12 | Polyferric chloride Polyaluminum chloride | 30 ppm 3 ppm | Under analytical sensitivity | 9.9 | — |
| Example 12 | | | — | — | 0.3 |

Examples 13 and 14, Comparative Examples 13 and 14

FIG. 1 illustrates a block diagram of a solid-liquid separator with a bag filter employed in Examples 13, 14, Comparative Examples 13 and 14.

A suspension containing 250 g/10 L of diatom earth was poured through valve 6 into a solid-liquid separator equipped with a bag filter having a membrane area of 0.25 m$^2$, and as a result, the surface of the bag filter was precoated with diatom earth only by filtering the suspension. Subsequently, the wastewater containing dioxin was flown at a flow rate of 1 m$^3$/hr for 3 hours, thereby filtered the wastewater. After the filtration, a container of the bag filter was opened up and a part of a cake was sampled from the filter, and after drying, an amount of dioxin was measured and determined as a blank (Comparative Example 13).

Further, an aqueous solution combining 1.5 kg/5 L of sodium persulfate and 1 kg/5 L of sodium hydroxide, an aqueous solution of sodium persulfate and an aqueous solution of sodium hydroxide were thrown in this order into the solid-liquid separator. Then, keeping the temperature within a range of 70 to 80° C., a decomposition reaction of the resultant solution was carried out for 7 hours. After the reaction terminated, a part of diatom earth was sampled, sufficiently agitating, and after drying, an amount of dioxin residue was measured (Example 13).

Subsequently, inside of the filter was washed by reverse flow and the decomposed substances were removed outside the system, repeating similar operations with the use of the same filter. After the filtration, a part of the diatom earth was sampled from the filter, sufficiently agitating, and after drying, an amount of dioxin was measured and determined as a blank (Comparative Example 14).

Further, an aqueous solution combining 1.5 kg/5 L of sodium persulfate and 1 kg/5 L of sodium hydroxide, an aqueous solution of sodium persulfate and an aqueous solution of sodium hydroxide were thrown in this order into the solid-liquid separator. Then, keeping the temperature within a range of 70 to 80° C., a decomposition reaction of the resultant solution was carried out for 7 hours. After the reaction terminated, a part of diatom earth was sampled, sufficiently agitating, and after drying, an amount of dioxin residue was measured (Example 14).

The solid-liquid separation equipment equipped with the further bag filter was manipulated as follows. Explanation will be described referring to FIG. 1.

(1) Solid-Liquid Separation Step (Filtration Concentration Step)

Valves 1, 5 and 6 were opened and valves 2, 4, 7, 8 and 9 were closed. Valve 6 was filled with the solution and then, turned to a closed state. The adsorbent was injected through valve 6. This system was designed for introducing the wastewater into the solid-liquid separator utilizing a fall of drain line 16.

(2) Step for Decomposing Hardly Decomposable Substance (Reaction Step)

Also with the use of pump 12, after opening valves 6 and 7 and closing other valves, a reagent was injected from a reagent tank by operating pump 12. After the injection of the reagent, closing valves 6 and 7 and opening valves 2, 3 and 4, further operating pump 13, the solution was cycled and heated by means of heat exchanger 14, and resultantly reacted.

Additionally, reference numeral 11 indicates a pressure gauge and reference numeral 15 indicates a temperature controlling trap.

(3) Back Wash Inside the Filter

Valves 2, 3, 4, 5, 6 and 9 were opened and the other valves were closed. City water was connected to the line directly tied with valve 9, into which the water was injected. Valve 6 was closed after degassing.

The measured data about the amount of dioxin each in Examples 13, 14, Comparative Examples 13 and 14 are shown in Table 6 respectively. From the above result, it was recognized that the reaction advances in closed system without manual operation and that the filter is reusable.

TABLE 6

| Sample Condition | Measured amounts of Dioxin(ng/g dry) | Decomposition ratio (%) |
| --- | --- | --- |
| Comparative Example 13 | 61.1 | — |
| Example 13 | 2.9 | 95.2 |
| Comparative Example 14 | 61.0 | — |
| Example 14 | 2.5 | 95.9 |

Examples 15 to 20, Comparative Example 15

Suspended substances accumulated in cleaning water for exhaust gas of incineration plant were precipitated and then, concentrated by suction filtration with the used of a filter of 0.4 μm mesh, thereby gathered sludge. A dioxin concentration in this sludge (moisture content: 62%) was measured and it was 45 ng/g dry sludge.

Throwing 20 g of the sludge into a container made of polytetrafluoroethylene having a capacity of 100 ml and then after adding various kinds of salt of peroxo acid powder, stirred at the rate of 10,000 rounds per minute for 3 minutes at room temperature with the use of a high speed mixer. The container made of polytetrafluoroethylene was placed into an autoclave, and it was heated for a predetermined time at various temperatures. Afterwards, dioxin concentrations about total amounts of samples in the polytetrafluoroethylene container were measured.

Operating condition and results in each Examples and Comparative Examples are shown in Table 7. In Table 7, the addition amounts of peroxide equivalent to what numbers of fold mole per dioxin among sludge were also shown. Further, the dioxin concentration was expressed with concentration corresponding to dry solid. The above descriptions are similarly applied to each following Examples and Comparative Examples. Additionally, various kinds of dioxins are contained in sludge, however, calculation of the folded mole was carried out with the use of 322 as a molecular weight of dioxin, which is a molecular weight of 2,3,7,8-tetrachlorodibenzo oxine having the greatest toxicity. The above description is also similarly applied to each following Examples 21 to 40 and Comparative Examples 16 to 26.

TABLE 7

| | Peroxides | | | Treated Temperature (° C.) | Treated Time (hr) | Amount of Dioxin (nanogram/ g sludge) |
| --- | --- | --- | --- | --- | --- | --- |
| | Kind | Addition amount (g) | (fold mole) | | | |
| Example 15 | Ammonium persulfate | 10 | $4.2 \times 10^7$ | 100 | 5 | 0.8 |
| Example 16 | Ammonium persulfate | 5 | $2.1 \times 10^7$ | 100 | 5 | 3.8 |
| Example 17 | Ammonium persulfate | 10 | $4.2 \times 10^7$ | 100 | 1 | 5.7 |
| Example 18 | Ammonium persulfate | 10 | $4.2 \times 10^7$ | 80 | 15 | 16 |
| Comparative Example 15 | — | — | — | 100 | 5 | 43 |
| Example 19 | Sodium persulfate | 10 | $4.2 \times 10^7$ | 100 | 5 | 6.3 |
| Example 20 | Potassium persulfate | 10 | $3.5 \times 10^7$ | 100 | 10 | 8.6 |
| Amount of dioxin among the treated sludge | | | | | | 45 |

Examples 21 to 23, Comparative Example 16

Reclaimed waste gas of complex catalyst was cleaned with a scrubber, and solid were separated from the cleaning water with the use of rotary flat membrane separator, followed by concentration with the use of a centrifugal separator.

Throwing 20 g of the solid (moisture content: 67%) into a container made of polytetrafluoroethylene having a capacity of 100 ml and then after adding peroxo acid at room temperature, stirred at the rate of 12,000 rounds per minute for 3 minutes with the use of a high speed mixer. The container made of polytetrafluoroethylene was placed into an autoclave, and it was heated for a predetermined time at various temperatures. Afterwards, dioxin concentrations about total amounts of samples in the polytetrafluoroethylene container were measured.

Operating condition and results in each Examples and Comparative Examples are shown in Table 8.

TABLE 8

| | Peroxides | | | Treated Temperature (° C.) | Treated Time (hr) | Amount of Dioxin (nanogram/ g sludge) |
| --- | --- | --- | --- | --- | --- | --- |
| | Kind | Addition amount (g) | (fold mole) | | | |
| Example 21 | Ammonium persulfate | 10 | $4.5 \times 10^6$ | 100 | 15 | 22 |
| Example 22 | Sodium persulfate | 10 | $4.4 \times 10^6$ | 100 | 15 | 28 |
| Example 23 | Potassium persulfate | 10 | $3.8 \times 10^6$ | 100 | 15 | 36 |
| Comparative Example 24 | — | — | — | 100 | 15 | 470 |
| Amount of dioxin among the treated solid | | | | | | 470 |

Examples 24 to 27 and Comparative Example 17 to 21

Sludge accumulated at the bottom of deposition site of leachate from trash incinerated ash reclaimed land were gathered and concentrated at acceleration of 8,000 G with the use of a continuous centrifugal separator. Throwing 20 g of the sludge (moisture content: 72%) into a container made of polytetrafluoroethylene having a capacity of 100 ml and then after adding various kinds of salt of peroxo acid, stirred at the rate of 10,000 rounds per minute for 3 minutes at room temperature with the use of a high speed mixer. The container made of polytetrafluoroethylene was placed into an autoclave, and it was heated for a predetermined time at various temperatures. Afterwards, dioxin concentrations about total amounts of samples in the polytetrafluoroethylene container were measured.

Operating condition and results in each Examples and Comparative examples are shown in Table 9.

TABLE 9

| | Peroxides | | Treated Temperature (° C.) | Treated Time (hr) | Amount of Dioxin (nanogram/g) |
|---|---|---|---|---|---|
| | Kind | Addition amount | | | |
| | | (ng) | (fold mole) | | | |
| Example 24 | Ammonium persulfate | $2 \times 10^9$ | $1.3 \times 10^7$ | 100 | 15 | 15 |
| Example 25 | Ammonium persulfate | $8 \times 10^9$ | $5.3 \times 10^7$ | 100 | 15 | 8.6 |
| Example 26 | Ammonium persulfate | $1.5 \times 10^{10}$ | $1.0 \times 10^8$ | 100 | 15 | 1.8 |
| Example 27 | Ammonium persulfate | $2 \times 10^{10}$ | $1.3 \times 10^8$ | 90 | 15 | 16 |
| Comparative Example 17 | — | — | — | 100 | 15 | 37 |
| Comparative Example 18 | Ammonium persulfate | $7.5 \times 10^2$ | 5.0 | 100 | 5 | 41 |
| Comparative Example 19 | Ammonium persulfate | $7.5 \times 10^3$ | $5.0 \times 10$ | 100 | 15 | 36 |
| Comparative Example 20 | Ammonium persulfate | $1.1 \times 10^4$ | $7.5 \times 10$ | 100 | 15 | 38 |
| Comparative Example 21 | Ammonium persulfate | $1.4 \times 10^4$ | $9.0 \times 10$ | 100 | 15 | 41 |
| Amount of dioxin among the treated sludge | | | | | | 38 |

Examples 28 to 30 and Comparative Example 22

Reclaimed waste gas of complex catalyst was cleaned with a scrubber, and solid were separated from the cleaning water with the use of rotary flat membrane separator, followed by concentration with the use of a centrifugal separator.

Throwing 20 g of the solid (moisture content: 67%) into a container made of polytetrafluoroethylene having a capacity of 100 ml and then after adding peroxo acid at room temperature, stirred at the rate of 12,000 rounds per minute for 3 minutes with the use of a high speed mixer. The container made of polytetrafluoroethylene was placed into an autoclave, and it was heated for a predetermined time at various temperatures. Afterwards, dioxin concentrations about total amounts of samples in the polytetrafluoroethylene container were measured.

Operating condition and results in each Examples and comparative Examples are shown in Table 10.

TABLE 10

| | Peroxides | | | Treated Temperature (° C.) | Treated Time (hr) | Amount of Dioxin (nanogram/g) |
|---|---|---|---|---|---|---|
| | Kind | Addition amount | | | | |
| | | (g) | (fold mole) | | | |
| Example 28 | 40% Sodium permanganate | 6 | $7.2 \times 10^5$ | 70 | 15 | 85 |
| Example 29 | Potassium hyperoxide | 5 | $3.0 \times 10^6$ | 100 | 15 | 104 |
| Example 30 | 70% tertiarybutyl hydroperoxide | 5 | $1.7 \times 10^6$ | 45 | 5 | 142 |

TABLE 10-continued

|  | Peroxides | | Treated Temperature (° C.) | Treated Time (hr) | Amount of Dioxin (nanogram/g) |
|---|---|---|---|---|---|
| | | Addition amount | | | |
| Kind | (g) | (fold mole) | | | |
| Comparative Example 22 | — | — | — | 100 | 15 | 360 |
| Amount of dioxin among the treated solid | | | | | 380 |

Examples 31 to 33 and Comparative Example 23

Soils were collected from the depth of 5 cm from the top of a surface layer of soil at a distance of 50 m from incineration plant for garbage. One hundred grams (water: 34%) of the collected soils were placed into glass-made conical flask having a capacity of 500 ml.

On the other hand, 5 g of sodium permanganate with 40% concentration was thrown into 50 ml of water, and the resultant solution was poured into the conical flask thereby forming slurry, followed by stirring at room temperature by means of an agitating rod for 30 minutes. Subsequently, the conical flask was heated at various temperatures while stirring. Afterwards, the total amount of the soils among the flask was analyzed.

Further, a section without adding sodium permanganate was provided as Comparative Example 23.

Operating condition and results in each Examples and Comparative Examples are shown in Table 11.

TABLE 11

| | Heating temperature (° C.) | Heating time (hr) | Amount of Dioxin (nanogram/g) |
|---|---|---|---|
| Example 31 | 30 | 5 | 10 |
| Example 32 | 45 | 5 | 8.7 |
| Example 33 | 70 | 5 | 6.6 |
| Comparative Example 23 | 70 | 5 | 32 |
| Amount of dioxin among the treated soil | | | 35 |

Examples 34 and 35, Comparative Examples 24 and 25

Dioxins among soil were decomposed with the use of sodium permanganate in a similar manner as Example 32 except that 1 kg of soil was thrown into a conical flask having a capacity of 5 L and that 10 g of 40% sodium permanganate dissolved into 500 ml of water and then, the resultant solution was added into the flask.

Afterwards, taking out the soil from the conical flask, transferred them in the amount of 50 g respectively into conical flasks each having capacities of 300 ml.

Adding 4 g of beech sawdust (moisture content: 16%) and 10 ml of water into each flask, the contents were mixed.

The flasks were placed into an autoclave and they were sterilized at the temperature of 121° C. for 15 minutes.

On the other hand, beech sawdust in an amount of 7 part by weight, bran in an amount of 3 part by weight and CMC in an amount of 0.5 part by weight were mixed, and after adjusting the moisture content to 65%, the resultant mixture was extrusion molded into pellets having a size of 10 mm in diameter.

The pellets were sterilized in an autoclave at the temperature of 121° C. for 20 minutes and then, using them as incubation mediums, wood decay fungus were inoculate into them, followed by incubating at the temperature of 30° C. for 14 days.

The pellets were added into the foregoing dioxins-contaminated soil and the resultant soil was incubated at the temperature of 30° C. for 30 days. Afterwards, an amount of dioxin in the flask was determined by content analysis.

For the purpose of comparison, a section without adding wood decay fungus and a section adding excess sludge of activated sludge instead of wood decay fungus were provided.

Operating condition and results in each Examples and Comparative examples are shown in Table 12.

TABLE 12

| | Microorganism | Amount of dioxin residue (nanogram/g) |
|---|---|---|
| Example 34 | Schizophillum commune IF06505 | 7.3 |
| Example 35 | Gloeophyllum trabeum IF06268 | 6.3 |
| Comparative Example 24 | Without inoculation | 10 |
| Comparative Example 25 | Excess sludge | 11 |

Examples 36 to 40, Comparative Example 26

Reclaimed waste gas of complex catalyst was cleaned with a scrubber, and the resultant wastewater was passed through an activated carbon cisterna thereby adsorbing dioxins. Taking out the activated carbon from the cisterna, each 50 g (moisture content: 53%) were thrown into polytetrafluoroethylene containers having capacities of 100 ml and 50 ml of water was further added respectively. The polytetrafluoroethylene containers were placed into iced water, and after adding organic peroxide, peroxides were made to adsorb onto the activated carbon by stirring the contents of the containers for 24 hours.

Afterwards, placing the polytetrafluoroethylene containers into incubators of various temperature, dioxins adsorbed onto the activated carbon were decomposed by reciprocate-shake of the incubators. Afterwards, a total amount of dioxin in the polytetrafluoroethylene container was determined. Additionally, the calculation of the amount was carried out on the condition that the specific gravity of di-tertiarybutyl peroxide is 0.79, the bulk density and the concentration of dicumyl peroxide powder are 0.58 and 40% respectively.

Operating condition and results in each Examples and Comparative Examples are shown in Table 13.

TABLE 13

|  | Peroxides | | | Heated temperature (° C.) | Decomposition time (hr) | Amount of Dioxin (nanogram/g) |
|---|---|---|---|---|---|---|
| Example 36 | Ditertiarybutyl peroxide | 250 | 5.1 × 10$^{10}$ | 30 | 5 | 6.7 |
| Example 37 | Ditertiarybutyl peroxide | 250 | 5.0 × 10$^{10}$ | 45 | 5 | 3.8 |
| Example 38 | Ditertiarybutyl peroxide | 250 | 4.9 × 10$^{10}$ | 80 | 5 | 2.9 |
| Example 39 | Dicumyl peroxide | 250 | 5.0 × 10$^{10}$ | 30 | 5 | 8.2 |
| Example 40 | Dicumyl peroxide | 250 | 5.1 × 10$^{10}$ | 45 | 5 | 3.4 |
| Comparative Example 26 | — | — | — | 80 | 5 | 34 |
| Amount of dioxin among treated activated carbon | | | | | | 35 |

Examples 41 to 45 and Comparative Examples 27 to 28

Soil contaminated by heavy oil was vacuum concentrated at the temperature of 120° C. and removed light hydrocarbon from the soil. Fifty grams of the soil was dividedly taken into a glass container, and an aqueous solution of peroxo acid was further added into the container, then, after sufficiently stirring the content of the container, it was placed into an autoclave, which was treated at various temperatures for a predetermined time. Afterwards, polycyclic aromatic hydrocarbon in the soil was extracted and determined. Operating condition and results in each Examples and Comparative Examples are shown in Table 14.

TABLE 14

|  | Peroxides | | | Heating | | Hardly decomposable substance (mg/kg of soil) | | | |
|---|---|---|---|---|---|---|---|---|---|
|  | Kind | Concentration of solution (%) | Addition amount (ml) | Temperature (° C.) | Time (hr) | A | B | C | D |
| Example 41 | Ammonium persulfate | 0.2 | 1000 | 100 | 5 | 63 | 72 | 61 | 40 |
| Example 42 | Ammonium persulfate | 2 | 100 | 100 | 5 | 21 | 38 | 31 | 12 |
| Example 43 | Ammonium persulfate | 2 | 100 | 120 | 5 | 11 | 24 | 26 | 8 |
| Example 44 | Potassium persulfate | 4 | 100 | 100 | 5 | 24 | 48 | 31 | 14 |
| Example 45 | Sodium permanganate | 2 | 100 | 100 | 5 | 19 | 32 | 23 | 9 |
| Comparative Example 47 | — | 0 | 100 | 120 | 5 | 115 | 133 | 128 | 76 |
| Comparative Example 48 | Ammonium persulfate | 0.02 | 10,000 | 120 | 5 | 107 | 128 | 127 | 71 |
| Hardly decomposable substance among treated soil | | | | | | 115 | 135 | 130 | 80 |

A: Benz (a) pyrene
B: Benz (b) fluoranthene
C: Chrysene
D: Benz (a) anthrathene

Examples 46 to 49

Dissolving 5,000 µg of bisphenol A, 5,000 µg of bisphenol S, 2,000 µg of octyl phenol, 2,000 µg of nonylphenol and 2,000 µg of pentachlorophenol into 50 ml of ethanol, the resultant solution was poured into a glass spray device. The ethanol solution was sprayed onto 1 kg (moisture content: 16%) of reddish brown soil. After further pouring 50 ml of ethanol into the spray device, the resultant co-cleaning liquid was sprayed onto the soil. The soil was vacuum dried until moisture content reached 8%, and the compound was made to adsorb onto the soil.

Transferring 25 g of the soil into a container having a capacity of 250 ml and after adding 25 ml of aqueous solution of various kinds of peroxo acid, the resultant solution was treated at various temperatures in an autoclave.

Operating condition and results in each Examples are shown in Table 15.

TABLE 15

| | Peroxides | | Treated | Treated | Hardly decomposable substance (mg/kg of soil) | | | | |
|---|---|---|---|---|---|---|---|---|---|
| | Kind | Concentration (g/l) | Temperature (° C.) | Time (hr) | Bisphenol A | Bisphenol S | Octyl phenol | Nonyl phenol | Penta chloro phenol |
| Example 46 | Sodium permanganate | 20 | 100 | 8 | 580 | 45 | 330 | 150 | 220 |
| Example 47 | Potassium permanganate | 20 | 100 | 8 | 680 | 85 | 520 | 120 | 360 |
| Example 48 | Ammonium persulfate | 50 | 45 | 8 | 2300 | 1300 | 590 | 410 | 870 |
| Example 49 | Ammonium persulfate | 50 | 100 | 8 | 760 | 800 | 160 | 140 | 490 |
| Concentration of the hardly decomposable substances among the treated soil | | | | | 4900 | 4600 | 1930 | 1780 | 2010 |

Comparative Examples 29 and 30

Comparative Examples 29 and 30 were carried out in similar manners as Examples 48 and 49 except that the concentrations of the aqueous solution of ammonium persulfate were changed.

Operating condition and results in each Comparative Examples are shown in Table 16.

TABLE 16

| | Peroxides | | Treated | Treated | Hardly decomposable substance (mg/kg of soil) | | | | |
|---|---|---|---|---|---|---|---|---|---|
| | Kind | Concentration (g/l) | Temperature (° C.) | Time (hr) | Bisphenol A | Bisphenol S | Octyl phenol | Nonyl phenol | Penta chloro phenol |
| Comparative Example 29 | Ammonium persulfate | 0.3 | 45 | 8 | 4800 | 4300 | 1850 | 1730 | 1980 |
| Comparative Example 30 | Ammonium persulfate | 0.3 | 100 | 8 | 4200 | 4200 | 1690 | 1650 | 1910 |
| Concentration of the hardly decomposable substances among the treated soil | | | | | 4600 | 4600 | 1930 | 1780 | 2010 |

Examples 50 to 52

Reclaimed waste gas of complex catalyst was cleaned with a scrubber, and solids were concentrated in the cleaning water with the use of a continuous centrifugal separator.

Further, a solid cake was formed by applying the concentrates to the centrifugal separator.

Throwing 20 g of the solid cake (moisture content: 76%) into a container made of polytetrafluoroethylene having a capacity of 100 ml and then after adding 10% sodium hydroxide solution, stirred at the rate of 12,000 rounds per minute for 3 minutes with the use of a high speed mixer. Afterwards, adding 50 ml of 10% aqueous solution of ammonium persulfate, the resultant solution was further stirred for 3 minutes with the use of the high-speed mixer. The container made of polytetrafluoroethylene was placed into an autoclave, and it was heated for a predetermined time at various temperatures. Afterwards, dioxin concentrations about total amounts of samples in the polytetrafluoroethylene container were measured.

Operating condition and results in each Example are shown in Table 17.

TABLE 17

| | Addition amount of sodium hydroxide solution (ml) | Treated Temperature (° C.) | Treated Time (hr) | Amount of Dioxin (nanogram/g) | pH after treatment |
|---|---|---|---|---|---|
| Example 50 | 8.75 | 100 | 15 | 4.7 | 4.5 |
| Example 51 | 17.5 | 100 | 15 | 3.6 | <12 |
| Example 52 | 0 | 100 | 15 | 6.2 | <1 |
| Amount of dioxin among treated solid cake | | | | 60 | |

Comparative Examples 31 to 33

Comparative Examples 31 to 33 were carried out in the same manners as Examples 50 to 52 except that city water was added instead of the aqueous solution of ammonium persulfate for the purpose of reference. Operating condition and results in each Examples and Comparative Examples are shown in Table 18.

TABLE 18

| | Addition amount of sodium hydroxide solution (ml) | Treated Temperature (° C.) | Treated Time (hr) | Amount of Dioxin (nanogram/g) |
|---|---|---|---|---|
| Comparative Example 31 | 8.75 | 100 | 15 | 55 |
| Comparative Example 32 | 17.5 | 100 | 15 | 55 |
| Comparative Example 33 | 0 | 100 | 15 | 60 |
| Amount of dioxin among treated solid cake | | | | 60 |

As the above results, the decomposition advanced enough even under the condition of from slightly acidic to alkalescence. The fact that the reaction advances under alkali condition using peroxo acid is not known and it has an advantage in the selection, maintenance and management of materials because corrosion of the decomposition container may be reduced remarkably.

Example 53 and Comparative Example 34

Pouring 100 ml of water containing dioxin into 2 centrifuge tubes made of polytetrafluoroethylene each having volume of 300 ml, and adding titan oxide (available from Ishihara Sangyo Kaisha, Ltd., trade name: ST-01) as an adsorbent in an amount that each correspond to 400 ppm respectively, and then, they were agitated for 12 hours by means of a sieve shaker. Subsequently, centrifugal separation was conducted with acceleration of 8000 G for 10 minutes. The content of 1 centrifuge tube was divided into supernatant and sediment as in Comparative Example 34, and a dioxin concentration was measured about each of them. Adding 100 ml of deionized water, 1 g of sodium persulfate and 0.6 g of sodium hydroxide into the sediment in the other centrifuge tube, they were reacted keeping the temperature at 70° C. for 24 hours. The reaction was named as Example 53 and a dioxin concentration was measured about the reactant. The measurement results are shown in Table 19.

TABLE 19

| Sample Condition | Category | Measured amounts of Dioxin (ng/pipe) | Decomposition ratio (%) |
|---|---|---|---|
| Comparative Example 34 | Supernatant | Under analytical sensitivity | — |
| | Sediment | 6.8 | — |
| Example 53 | Sediment after decomposition | 0.7 | 90 |

Example 54 and Comparative Example 34

Pouring 100 ml of water containing dioxin into 2 centrifuge tubes made of polytetrafluoroethylene each having volume of 300 ml, and adding titan oxide (available from Ishihara Sangyo Kaisha, Ltd., trade name: ST-01) and an inorganic coagulant (available from EARTH CLUSTER Incorporated, trade name: MOSSNITE) as adsorbents each in an amount that corresponds to 400 ppm and 100 ppm respectively, and then, they were agitated for 12 hours by means of a sieve shaker. Subsequently, centrifugal separation was conducted with acceleration of 8000 G for 10 minutes. The content of 1 centrifuge tube was divided into supernatant and sediment as in Comparative Example 35, and a dioxin concentration was measured about each of them. Adding 100 ml of deionized water, 1 g of sodium persulfate and 0.6 g of sodium hydroxide into the sediment in the other centrifuge tube, they were reacted keeping the temperature at 70° C. for 24 hours. The reaction was named as Example 54 and a dioxin concentration was measured about the reactant. The measured results are shown Table 20.

TABLE 20

| Sample Condition | Category | Measured amounts of Dioxin (ng/pipe) | Decomposition ratio (%) |
|---|---|---|---|
| Comparative Example 35 | Supernatant | Under analytical sensitivity | — |
| | Sediment | 6.1 | — |
| Example 54 | Sediment after decomposition | 0.4 | 93 |

INDUSTRIAL APPLICABILITY

The present invention enables to provide a method of treating wastewater containing hardly decomposable harmful substances which separates the hardly decomposable harmful substances from wastewater by coagulation or adsorption and efficiently decomposes the separated hardly decomposable harmful substances in the solid condition without carrying out desorption operation.

What is claimed is:

1. A method of treating a substance comprising:
   (A) adding coagulant into a wastewater comprising the substance,
   (B) performing solid-liquid separation which separates a solid comprising the substance from the wastewater, and
   (C) decomposing the substance by bringing a peroxide into contact with the separated solid,
   wherein the peroxide does not comprise hydrogen peroxide, and
   wherein the substance is at least one kind selected from the group consisting of dibenzodioxin halides, dibenzofuran halides, polychlorinated biphenyls, benzene halides, alkylphenols, phenol halides, alkane halides, alkene halides, phthalic esters, bisphenols and polycyclic aromatic hydrocarbons.

2. The method of claim 1, wherein the coagulant employed in (A) is at least one kind selected from the group consisting of polyacrylic acid, polyacrylamide resin, ferrous coagulant and aluminum-based coagulant.

3. The method of claim 2, wherein the coagulant comprises the ferrous coagulant, and wherein the ferrous coagulant is at least one kind selected from the group consisting of ferric sulfate, polyferric sulfate, ferric chloride and polyferric chloride.

4. The method of claim 2, wherein the coagulant comprises the aluminum-based coagulant, and wherein the aluminum-based coagulant is at least one of aluminum chloride and polyaluminum chloride.

5. The method of claim 1, further comprising adding a coagulation promoter in (A).

6. The method of claim 5, wherein the coagulation promoter is an inorganic porous article or an organic porous article.

7. The method of claim 5, wherein the coagulation promoter is at least one kind selected from the group consisting of ion exchange resin, diatom earth, activated clay, zeolite, pearlite and activated carbon.

8. The method of claim 1, wherein the solid-liquid separation in (B) comprises at least one method selected from the group consisting of a filtration method, a centrifugal separation method, and a membrane separation method.

9. The method of claim 1, wherein the peroxide utilized in (C) is an oxidizing agent.

10. The method of claim 9, wherein the oxidation agent comprises at least one of persulfate and permanganate.

11. The method of claim 10, comprising the persulfate, wherein the persulfate is at least one kind selected from the group consisting of ammonium persulfate, sodium persulfate and potassium persulfate.

12. The method of claim 10, comprising the permanganate, and wherein the permanganate is at least one of sodium permanganate and potassium permanganate.

13. The method of claim 1, wherein the peroxide utilized in (C) is at least one selected from the group consisting of a salt of peroxo acid, hyperoxide and organic peroxide.

14. The method of claim 13, comprising the salt of the peroxo acid, wherein the salt of peroxo acid is perborate or organic peroxide.

15. The method of claim 13, comprising the hyperoxide, wherein the hyperoxide is at least one selected from the group consisting of potassium hyperoxide, sodium hyperoxide, barium hyperoxide and magnesium hyperoxide.

16. The method of claim 13, comprising the organic peroxide, wherein the organic peroxide is selected from the group consisting of ditertiarybutylperoxide, dicumyl peroxide, and combinations thereof.

17. A method of treating a substance comprising:
(a) adding an adsorbent into a wastewater comprising the substance,
(B) performing solid-liquid separation which separates a solid comprising the substance from the wastewater, and
(C) decomposing the substance by bringing a peroxide into contact with the separated solids,
wherein the substance is at least one kind selected from the group consisting of dibenzodioxin halides, dibenzofuran halides, polychlorinated biphenyls, benzene halides, alkylphenols, phenol halides, alkane halides, alkene halides, phthalic esters, bisphenols and polycyclic aromatic hydrocarbons.

18. The method of claim 17, wherein the adsorbent is at least one selected from the group consisting of an ion exchange resin, a diatom earth, an activated clay, a zeolite, a pearlite, a titania and an activated carbon.

19. A method of treating a substance wherein the substance is adsorbed to a solid and is brought into contact with a peroxide in an amount of 100 moles per the substance without conducting any desorption operation, wherein the peroxide does not comprise hydrogen peroxide, and wherein the substance is at least one kind selected from the group consisting of dibenzodioxin halides, dibenzofuran halides, polychlorinated biphenyls, benzene halides, alkylphenols, phenol halides, alkane halides, alkene halides, phthalic esters, bisphenols and polycyclic aromatic hydrocarbons.

20. The method of claim 19, wherein the solid is any one of soil, sludge, incinerated ash or adsorbent.

21. The method of claim 19, wherein the peroxide is at least one selected from the group consisting of salt of peroxo acid, hyperoxide and organic peroxide.

22. The method of claim 19, comprising the salt of the peroxo acid, wherein the salt of peroxo acid is at least one selected from the group consisting of persulfate, permanganate, perborate and organic peroxide.

23. The method of claim 22, comprising the persulfate, wherein the persulfate is at least one selected from the group consisting of ammonium persulfate, sodium persulfate and potassium persulfate.

24. The method of claim 22, comprising the permanganate, wherein the permanganate is any one of sodium permanganate and potassium permanganate.

25. The method claim 21, comprising the hyperoxide, wherein the hyperoxide is at least one selected from the group consisting of potassium hyperoxide, sodium hyperoxide, barium hyperoxide and magnesium hyperoxide.

26. The method of claim 21, comprising the organic peroxide, wherein the organic peroxide is selected from the group consisting of ditertiarybutylperoxide, dicumyl peroxide, and combinations thereof.

27. A method of treating a substance comprising:
(A) adding coagulant into a wastewater comprising the substance,
(B) performing solid-liquid separation which separates a solid comprising the substance from the wastewater, and
(C) decomposing the substance by bringing at least one peroxide selected from the group consisting of a salt of a peroxo acid, hyperoxides, and organic peroxides into contact with the separated solid,
wherein the hardly decomposable harmful substance is at least one kind selected from the group consisting of dibenzodioxin halides, dibenzofuran halides, polychlorinated biphenyls, benzene halides, alkylphenols, phenol halides, alkane halides, alkene halides, phthalic esters, bisphenols and polycyclic aromatic hydrocarbons.

* * * * *